United States Patent [19]

Fujimoto et al.

[11] Patent Number: 4,791,444
[45] Date of Patent: Dec. 13, 1988

[54] WASTE SOLUTION TREATING APPARATUS

[75] Inventors: Hiroshi Fujimoto; Kiichiro Sakamoto, both of Kanagawa, Japan

[73] Assignee: Fuji Photo Film Co., Ltd., Kanagawa, Japan

[21] Appl. No.: 58,102

[22] Filed: Jun. 4, 1987

[30] Foreign Application Priority Data

Jun. 4, 1986 [JP] Japan .................. 61-128147
Jun. 4, 1986 [JP] Japan .................. 61-128148

[51] Int. Cl.⁴ ............................................. G03D 3/02
[52] U.S. Cl. ..................................... 354/324; 34/155; 159/33
[58] Field of Search ............... 354/320, 321, 322, 324; 34/150, 155, 86; 159/3, 4.04, 16.1, 33; 203/49

[56] References Cited

U.S. PATENT DOCUMENTS

| | | | |
|---|---|---|---|
| 3,978,506 | 8/1976 | Geyken et al. | 354/324 |
| 3,995,298 | 11/1976 | Vandeputte et al. | 354/324 |
| 4,302,317 | 11/1981 | Mock | 354/324 |
| 4,346,980 | 8/1982 | Palazzolo | 354/324 |
| 4,724,044 | 2/1988 | Weisharr et al. | 354/324 |

Primary Examiner—A. A. Mathews
Attorney, Agent, or Firm—Sughrue, Mion, Zinn, Macpeak & Seas

[57] ABSTRACT

A waste solution treating apparatus used in combination with a photographic processing apparatus wherein a photographic material is automatically processed with a processing solution and dried in a drying chamber and a predetermined amount of the processing solution is run to waste and supply replenishing solution continuously comprises a housing for a treating chamber; a member for discharging the processing solution to be wasted into the treating chamber; a treating device in the housing for allowing the processing solution discharged into the treating chamber to flow thereover thereover; an air conducting member for supplying air heated in the drying chamber into the treating chamber to heat the treating device with the heated air in order to condense and solidify the processing solution while the processing solution is flowing over the treating device.

11 Claims, 5 Drawing Sheets

WASTE SOLUTION TREATING APPARATUS

BACKGROUND OF THE INVENTION

The present invention relates to a waste solution treating apparatus, and more particularly to an apparatus for condensing or solidifying used processing solutions in an automatic photographic processor.

An automatic photographic processing apparatus for processing photographic materials such as photographic films, photographic papers or the like comprises a processing section and a drying section; the processing section including therein a developing tank containing a developer, a silver recovery tank containing a desilvering bath such as a bleaching-fixing solution and a washing tank for rinsing in this order. An exposed photographic material, for example a photographic paper, progresses in the processing solution tanks at a predetermined proper rate by means of a conveyer comprising rollers and /or belts and then to the drying section wherein the photographic paper is blown dry.

As is well known to those skilled in the art, since the processing solutions used in the automatic photographic processor, in particular the developer and desilvering bath, deteriorate and the rinsing solution is contaminated with both the developer and the desilvering solution sticking to the photographic paper, each solution should be discarded so as to run a small but constant amount of working solution to waste in order to make room in the solution tank for sufficient replenisher. For this reason, each tank is provided with an automatic replenishment system for feeding replenishing solution into the solution tank either in doses or continuously and draining waste solution into a reservoir.

From the point of view of environmental pollution prevention, it is forbidden to throw away the waste solution in rivers. Therefore in fact traders are asked to collect the waste solution which contains silver particles. In resent years, there has been marketed a waste solution treating machine which can separate and collect solidified substances contained in the waste solution. The waste solution treating machine which can be connected to the automatic photographic processor by means of a coupling pipe, reserves temporarily the waste solution in a reservoir and then feed it to a transferring reservoir provided with a transferring roller rotatably mounted thereon. The transferring roller which is partly sunk in the waste solution reserved in the transferring reservoir transfers the waste solution onto a rotary heat roller so as to dehydrate. Solid substances as harmfull residua remaining on the outer surface of the rotary heat roller are scraped by means of a scraper and collected in a slag collecting box, while the gasified components are fed to a gas-water separator in order to separate moisture from the gas. The gas separated in the gas-water separator is discharged into the air and the water remaining in the gas-water separator is discharged into a river.

A problem of the above-described waste solution treating machine is the provision of a heater in association with the rotary heat roller for condensing and/or solidifying partly the waste solution not only because of consuming much electricity but also because of a high cost of maintenance.

Another problem is that the above-described waste solution treating machine must be separately from the automatic photographic processor and is disadvantageously high in installing cost.

OBJECTS OF THE INVENTION

It is, therefore, an object of the present invention to provide a waste solution treating apparatus for use with an automatic photographic processor which requires no rotary heat roller and hence no extra heat source.

It is another object of the present invention to provide a waste solution treating apparatus which is considerably low not only in installation cost but also in maintenance cost.

It is still another object of the invention to provide a waste solution treating apparatus which can be used in combination with a conventional automatic photographic processor.

SUMMARY OF THE INVENTION

According to the present invention, the waste solution treating apparatus comprises means for discharging in the waste solution treating apparatus from solution tanks in an automatic photographic processor; means disposed in the waste solution treating apparatus for allowing the processing solution discharged to flow thereover; and means for conducting air heated in the drying chamber of the automatic photographic processor into the waste solution treating apparatus in order to heat the treating means, thereby at least condensing the processing solution while the processing solution is flowing over the treating means.

According to a preferred embodiment of the waste solution treating apparatus of the present invention, each solution required for processing is discarded through a drain pipe into a waste solution treating chamber which in turn is in communication with the drying chamber of the automatic photographic processor through a pipe for feeding a part of air heated in the drying chamber. The discharged waste solution in the waste solution treating chamber is heated with the heated air and condensed or solidified. For efficient condensing or solidifying the waste solution, it is desirable to form the treating means as brushes with a large number of thin wires set out radially downward or flexible bellows-like drainboard with a large number of orifices formed therein for spreading and absorbing the waste solution discharged thereon. Solidified substances absorbed onto the wires or drainboard are either manually or automatically scraped by the use of a scraper and collected in a slag collecting box 35.

The waste solution treating apparatus of the present invention is basically available in combination with any automatic photographic processor provided with a drying chamber. Therefore, the waste solution treating apparatus of the present invention can be applicable to automatic photographic processors used to process photographic materials for industrial, printing, medical, business, and general uses without distinction of white and black and color. Furthermore, the waste solution treating apparatus of the present invention is applicable independently from the composition of a processing solution to be used in an automatic photographic apparatus which is in combination therewith.

BRIEF DESCRIPTION OF THE DRAWINGS

These and other objects and features of the present invention will become apparent from the following description taken in conjunction with the preferred embodiments thereof with reference to the accompanying drawings, in which like parts are designated by like reference numerals throughout the views thereof and wherein.

DETAILED DESCRIPTION OF THE INVENTION

Figure 1:
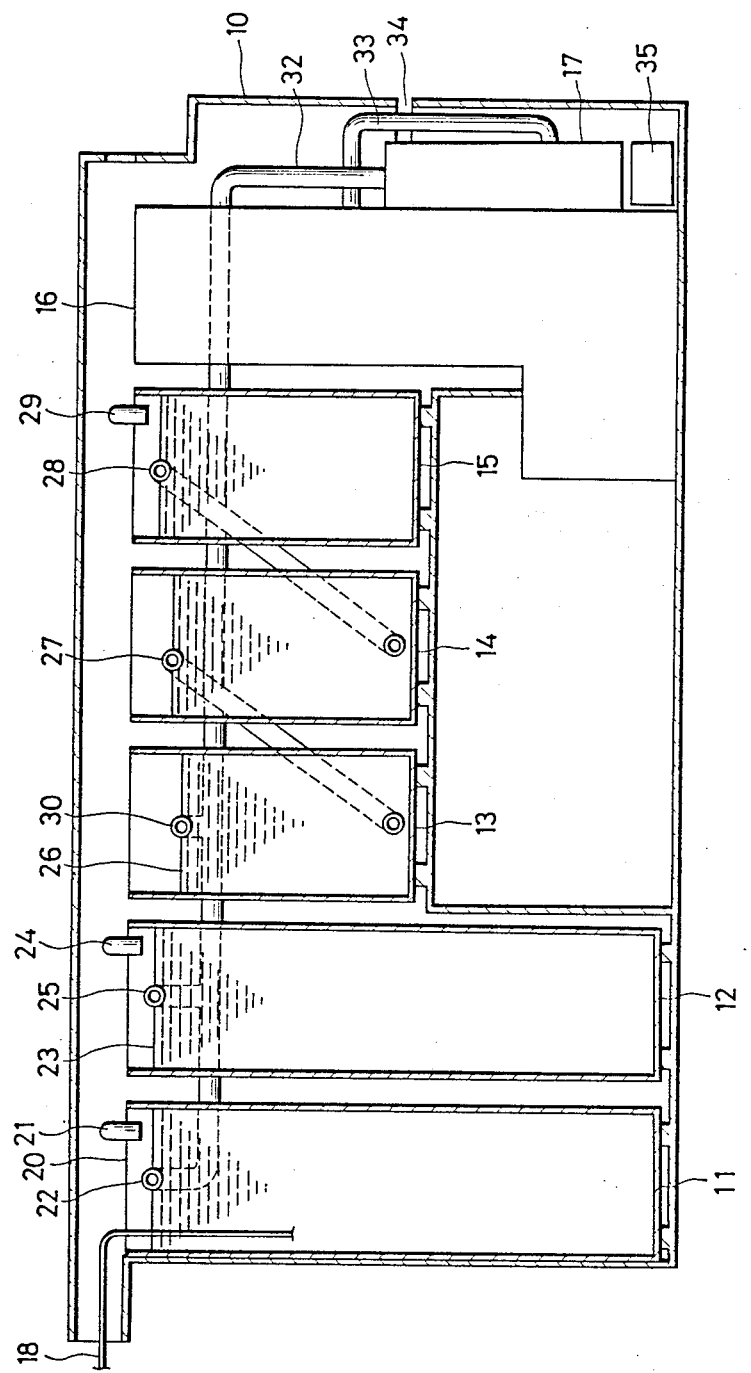
FIG. 1 is a vertical sectional view of an automatic photographic processor which incorporates a waste solution treating apparatus of a preferred embodiment according to the present invention therein.

Referring now to FIG. 1 shown therein is an automatic photographic processor 10 comprising a color developing tank 11, a desilvering tank such as a bleaching-fixing tank 12, a set of washing tanks 13 to 15, a drying chamber 16, and a waste solution treating chamber 17. In the automatic photographic processor 10, there is conveying means mainly comprising rollers and/or belts (not shown) for conveying a long stripe of photographic material 18 through the tanks 11 to 15 and the chamber 16 in order to perform the color developing, bleaching-fixing and washing procedures of the photographic material 18. The photographic material 18 from the washing tank 16 is blown dry with heated air.

Disposed on the top of the developing tank 11 containing color developer 20 therein is a feed pipe 21 for feeding replenishing solution, namely fresh color developer, continuously into the developing tank 11 from a replenishing solution reservoir (not shown) at a constant flow rate. There is also disposed a drain pipe 22 to run a small but constant amount of working color developer to waste in order to make room in the developing tank 11 for sufficient replenisher. Disposed on the top of the bleaching-fixing tank 12 containing bleaching-fixing solution 23 therein is a feed pipe 24 for feeding replenishing solution, namely fresh bleaching-fixing solution, continuously into the bleaching-fixing tank 12 from a replenishing solution reservoir (not shown) at a constant flow rate. Also disposed is a drain pipe 25 to run a small but constant amount of working bleaching-fixing solution to waste in order to make room in the bleaching-fixing tank 12 for sufficient replenisher.

In each washing tank 13, 14, 15 is rinsing solution 26 for rinsing the bleaching-fixing solution out of the photographic material 18. The washing tanks 13 and 14 are communicated with their downstream washing tanks 14 and 15 by means of connecting pipes 27 and 28, respectively. On the top of the downstream washing tank 15 is a feed pipe 29 for feeding replenishing solution, namely fresh rinsing solution, continuously into the washing tank 15 from a replenishing solution reservoir (not shown) at a constant flow rat. On the other hand, on the top of the upstream washing tank 13, there is a drain pipe 30 to run a small but constant amount of working solution to waste in order to make room in the washing tank 13, and hence in the washing tanks 14 and 15, for sufficient replenisher.

Each drain pipe 22, 25, 30 is communicated with a waste solution duct 32 which conveys the waste solutions from the respective tanks 11, 12 and 13 to a waste solution treating chamber 17 to condense or solidify therein. The waste solution treating chamber 17 is communicated with the drying chamber 16 by means of an air duct 33 to receive heated air for speeding up the progress of condensation or solidification. Designated by reference numerals 34 and 35 are an exhaust pipe connected to the waste solution treating chamber 17 and a collecting box for solidified substances, respectively.

Figure 2:
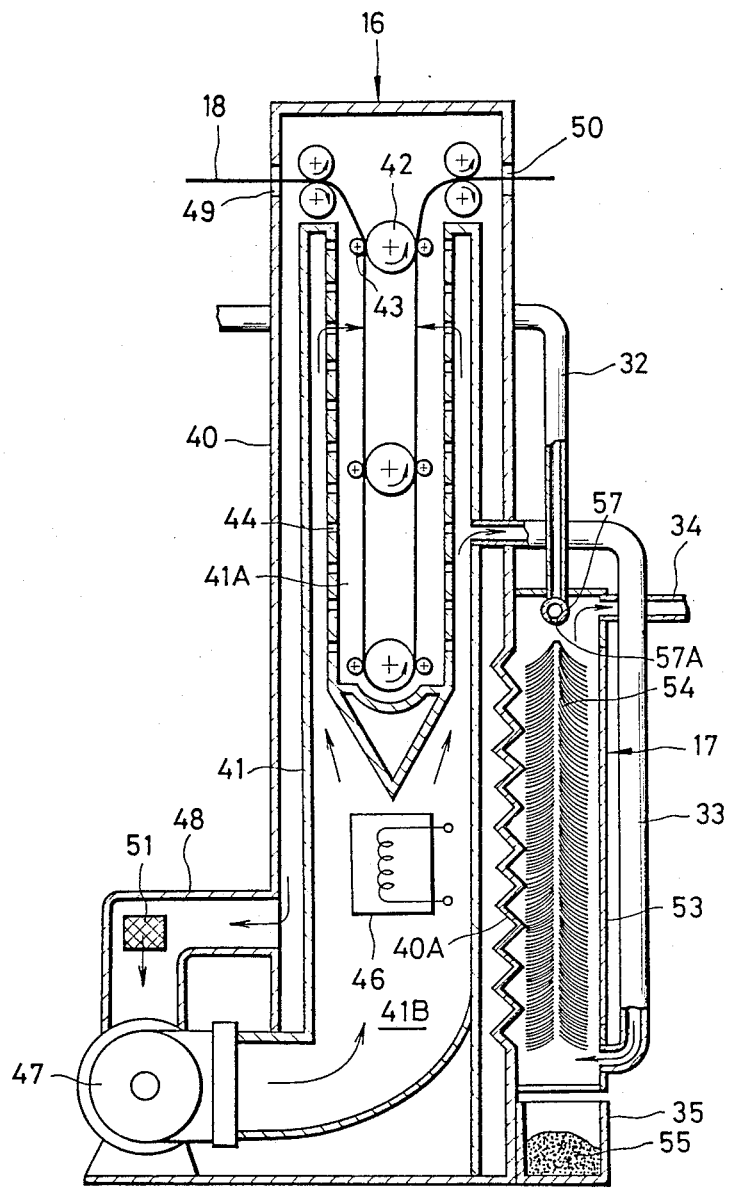
FIG. 2 is a vertical sectional view of a waste solution treating apparatus in combination with a drying section of the automatic processor of FIG. 1.

Reference is had to FIG. 2 showing the waste solution treating chamber 17 in combination with the drying chamber 16 of the automatic photographic processor of FIG. 1. The drying chamber 16 has an outer housing 40 wherein a partly double walled tube 41 with square cross section and its upper end opened is installed to provide an inner drying room 41A and an outer ventilation room 41B. The inner and outer rooms 41A and 41B are communicated with each other by means of a plurality of tiny jets 44 formed in the inner wall of the double walled tube 41. In the inner drying room 41A, there are three large rollers 42, each being associated with two small rollers 43, along which the photographic material 18 loops.

There is an electric heater 46 just below the inner drying room 41A in the outer ventilation room 41B so as to heat air sent from an air blower 47. The heated air is partly blasted from the tiny jets 44 into the drying room 41A and circulated through a pipe 48 connected to the outer housing 40, while partly exhausted through an entrance 49 and an exit 50 for the photographic material 18. For replenishing fresh air, just before the air blower 47, there is an air inlet 51 formed in the outer wall of the pipe 48 to intake a small amount of flesh air.

The waste solution treating chamber 17 has a housing comprising a partition wall 40A of the housing 40 of the drying chamber 16 and a box-like cover casing 53. The waste solution treating chamber 17 is, at its bottom, communicated with the inside of the ventilation room 41B by means of a pipe 33 so as to receive a part of the heated air from the ventilation room 41B. At the top of the waste solution treating chamber 17 is an exhaust pipe 34 connected thereto to exhaust gas. On the other hand, at the top of the waste solution treating chamber 17 is the waste solution duct 32 connected thereto to supply the waste solutions from the respective solution tanks 11, 12 and 13. As is seen in Fig.2, the partition wall 40A of the housing 40 is in the form of bellows which contributes to increase the quantity of heat released therefrom.

In the waste solution treating chamber 17, there are further installed a plurality of brushes 54 arranged side by side. Each blush 54 has corrosion-resisting stainless steel thin wires or plastic wires which are set out radially downward. The waste solution supplied through the waste solution duct 32 flows down by the help of the wires which are heated with the heated air and is thereby heated. As a result, the waste solution is partly evaporated and partly condensed and solidified. The resulting solidified substance 55 is collected in the slug collecting box 35.

Figure 3:
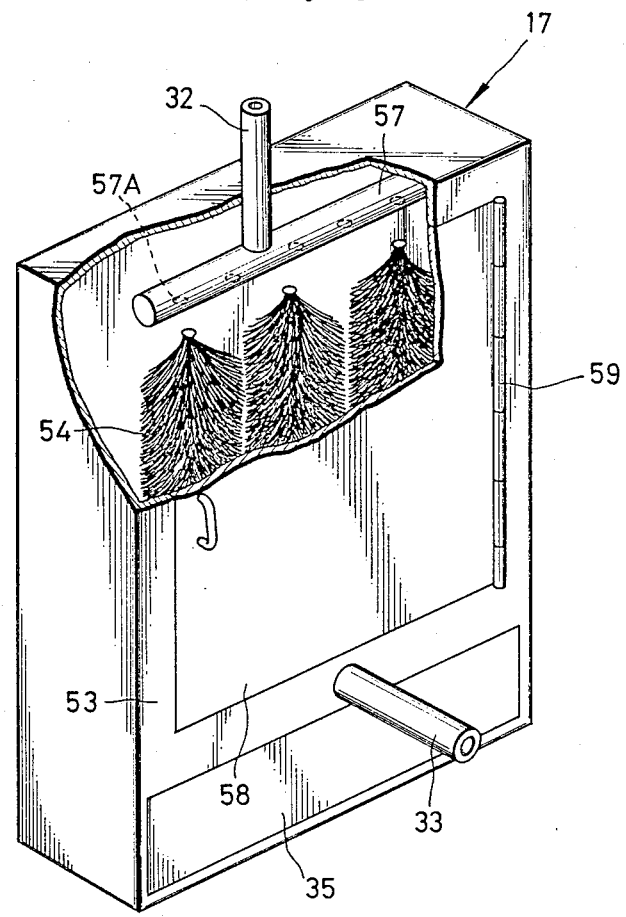
FIG. 3 is a partyly cut away perspective view of the waste solution treating apparatus according to the present invention.

Reference is now had to FIG. 3 illustrating the waste solution treating chamber 17 in more detail. In the waste solution treating chamber 17, a pipe 57 with a line of orifices 57A is disposed transversely above the wire brushes 54 and connected to the waste solution duct 32 at the middle thereof. The orifices 57A are so arranged as to distribute the waste solution uniformly over the plurality of wire brushes 54. Mounted by a hinge 59 on the cover casing 53 of the waste solution treating chamber 17 is a front door 58 for opening and closing movement.

In operation of the automatic photographic processor to which the present invention is applied, it is assumed that the amount of working solution to be wasted is approximately 0.5l per one square meter of color film and so approximately 3.0l of working solution should be wasted daily if the automatic photographic processor processes 40 rolls of color films a day. The waste solution is supplied to the waste solution treating chamber 17 through the waste solution duct 32 and discharged through the line of orifices 57A of the pipe 57 so as to drop down over the wire brushes 54. As the waste solution treating chamber 17 receives heat transmitting from the ventilation room 41B through the part 40A of the outer housing 40 of the drying chamber 16 and the heated air from the ventilation room 41B through the pipe 33, the wires of the wire brushes 54 are heated, heating the wasted solution dropping down on the brushes 54. As a result, a part of the waste solution is gasified while the remaining part thereof is condensed and solidified to stick to the wires. It is desired to deodorize the evaporated gas exhausted from the exhaust pipe 34 and then to discharge the deodorized gas into the air.

As a greater part of the solidified substances on the wires of the brushes 54 remains stuck to the wires while partly falls down spontaneously, it is necessary to rub the wires with hands to remove the solidified substances. The solidified substances thus removed are collected in the collecting box 35. The brushes 54 used for a long time can be replaced with new ones. For the rubbing of the wires and the replacement of the used brushes 54, the provision of the door 58 is convenient.

Figure 4:
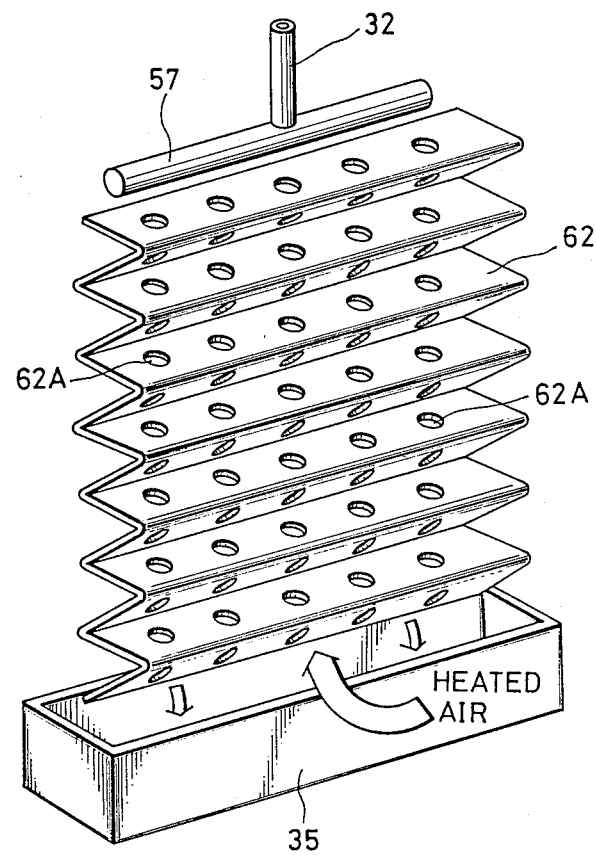
FIG. 4 is a perspective view showing an essential part of the waste solution treating apparatus of another embodiment according to the present invention.

Various types of waste solution spreading means can be available in place of the brushes 54 shown in FIGS. 1 and 3. Taking a plate type waste solution spreading means for instance, effectively usable is a bellows-like drainboard shown in FIG. 4 wherein parts same or similar to those in FIG. 1 are designated by like reference numerals. The bellwos-like drainboard 62 which is desirably made of metal or plastic materials is flexible so as to be capable of expansion and contraction and formed with a large number of orifices 62A therein. The waste solution discharged through the line of the orifices 57A of the pipe 57 is partly evaporated with heat supplied from the drying chamber 16 while running down over the drainboard 62. A smooth running-down of the waste solution is caused with the aid of the large number of orifices 62A. In the same way as described as to the brushes 54, the remaining part of the waste solution is condensed and solidified, sticking to outer surfaces of the drainboard 62. For removing the solidified substances, the drainboard 62 is vibrated by being expanded and contracted. The removed substances is collected in the slug collecting box 35.

Figure 5:
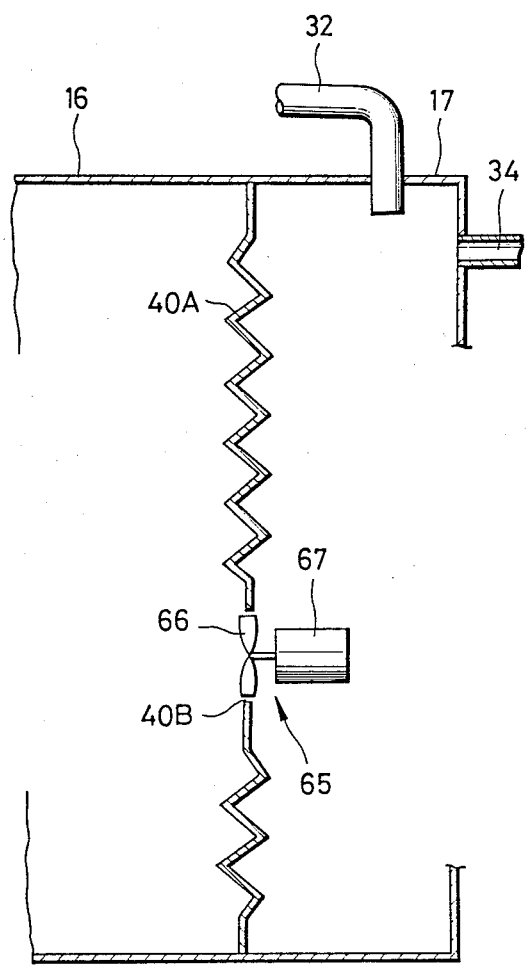
FIG. 5 is a sectional view showing partly the waste solution treating apparatus of still another embodiment according to the present invention.

Reference is now had to FIG. 5 showing another embodiment of the present invention wherein the pipe 33 of Fig. 1 is omitted. For transmitting heated air from the drying chamber 16 to the waste solution treating chamber 17, there is, in this embodiment, a fan blower 65 comprising a fan 66 and an electric motor 67. The fan 66 is placed in an opening 40B formed in the partition wall 40A provided between the drying and waste solution treating chambers 16 and 17. The provision of the fan blower 65 considerably contributes to efficient heat supply to the waste solution treating chamber 17.

Although the waste solution treating apparatus 17 of the present invention is incorporated in the automatic photographic processor of the above-described embodiments, it is apparent to those skilled in the art that the waste solution treating apparatus 17 may be separately provided and adapted to be connectable to the drying chamber 16 of the automatic processing apparatus through the waste solution duct 32 and the heated air conducting pipe 33. In this case, the partition wall 40A between the drying and waste solution treating chambers 16 and 17 will be replaced with respective back walls.

Although the present invention has been described in connection with the preferred embodiments with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A waste solution treating apparatus for use with a photographic processing apparatus which is adapted to process a photographic material with a processing solution and to dry the processed photographic material in a drying chamber, a predetermined amount of said processing solution being run to waste and to supply replenishing solution continuously, said waste solution treating apparatus comprising;

a housing;

means for discharging said processing solution to be wasted into said housing;

treating means disposed in said housing for allowing said processing solution discharged into said housing to flow thereover;

means for conducting air heated in said drying chamber of said processing apparatus into said housing in order to heat said treating means, thereby at least condensing said processing solution while said processing solution is flowing over said treating means.

2. A waste solution treating apparatus as defined in claim 1, wherein said treating means comprises a plurality of brushes with a large number of thin wires set out radially downward.

3. A waste solution treating apparatus as defined in claim 1, wherein said treating means comprises a flexible bellows-like drainboard with a large number of orifices formed therein.

4. A waste solution treating chamber as defined in claim 1, wherein said housing is provided with a door for access to an inside thereof.

5. A waste solution treating apparatus for use with a photographic processing apparatus which is adapted to process a photographic material with a processing solution and to dry the processed photographic material in a drying chamber, a predetermined amount of said processing solution under working being run to be waste and to supply replenishing solution continuously, said apparatus comprising;

a housing having a partition wall which is partly defining said drying chamber;

means for discharging said processing solution to be wasted into said housing;

treating means disposed in said housing for allowing said processing solution discharged into said housing to flow thereover;

means for conducting air heated in said drying chamber of said processing apparatus into said housing in order to heat said treating means, thereby at least condensing said processing solution while said processing solution is flowing over said treating means.

6. A waste solution treating apparatus as defined in claim 5, wherein said partition wall is shaped in the form of a bellows.

7. A waste solution treating apparatus as defined in claim 5, wherein said air conducting means is a pipe connected between said drying chamber and said housing.

8. A waste solution treating apparatus as defined in claim 5, wherein said air conducting means is a fan blower comprising a fan disposed a space defined by a hole formed in said partition wall.

9. A waste solution treating apparatus as defined in claim 5, wherein said treating means comprises a plurality of brushes with a large number of thin wires set out radially downward.

10. A waste solution treating apparatus as defined in claim 5, wherein said treating means comprises a flexible bellows-like drainboard with a large number of orifices formed therein.

11. A waste solution treating apparatus as defined in claim 5, wherein said housing is provided with a door for access to an interior thereof.

* * * * *